United States Patent Office 3,287,918
Patented Nov. 29, 1966

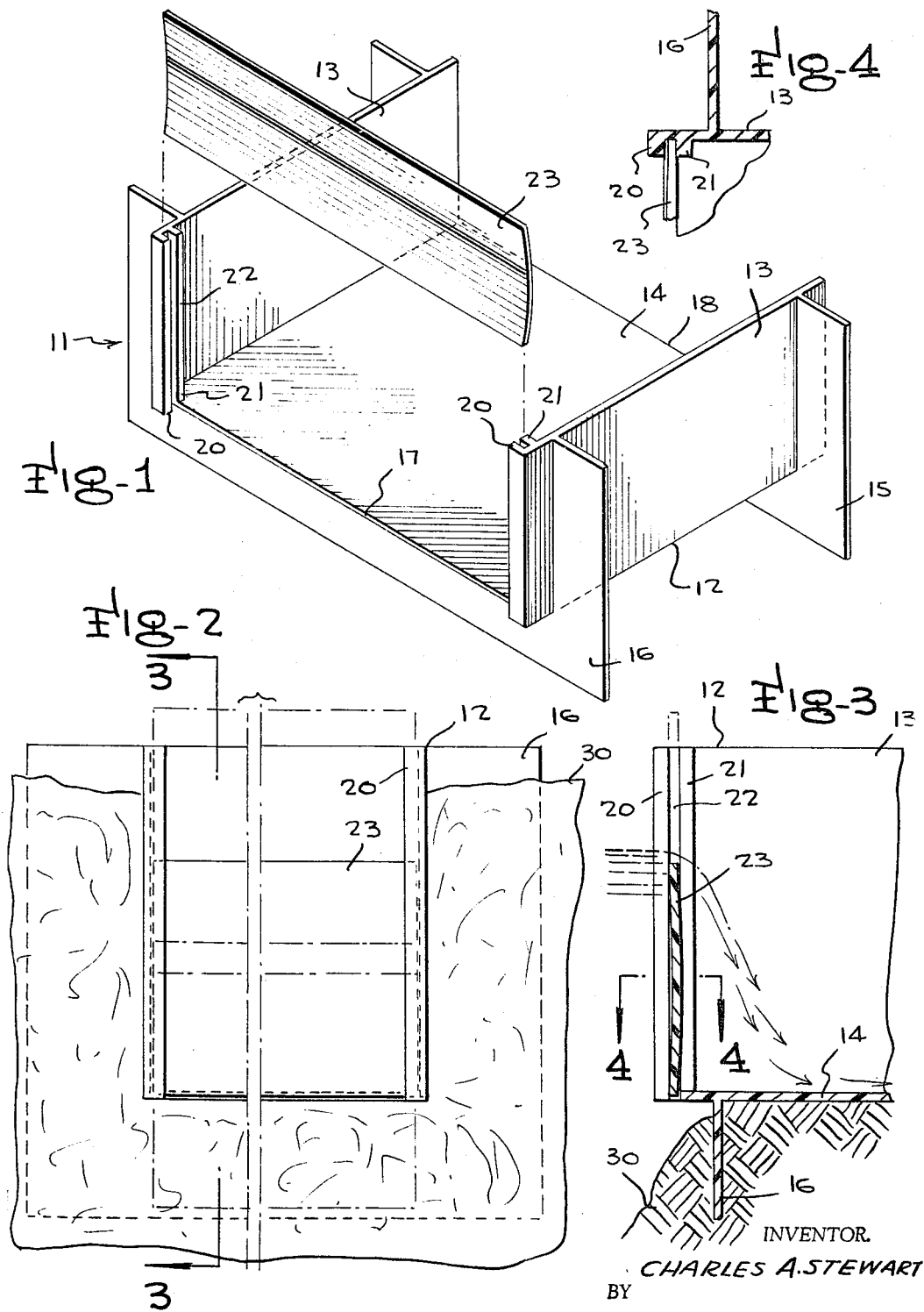

3,287,918
WATER LEVEL CONTROL DEVICE
Charles A. Stewart, 609 Rector Bldg., Little Rock, Ark.
Filed Aug. 16, 1963, Ser. No. 302,622
3 Claims. (Cl. 61—28)

This invention relates to water control gates for irrigation systems, and more particularly to a control gate to be employed for regulating the flow of water from one rice levee to another, to enable rice fields to be flooded as required.

A main object of the invention is to provide a novel and improved gate device for controlling the flow of water between rice levees, the control gate device being relatively simple in construction, being very easy to install, and being adjustable so that it can be employed to hold the water at any desired constant level, to drain off any desired amount of water, and to be operated in a manner to minimize levee breakage.

A further object of the invention is to provide an improved water control gate adapted to be employed between adjacent rice fields and being adjustable to control the flow of water from one rice field to an adjacent rice field, the gate device being inexpensive to fabricate, being durable in construction, being relatively light in weight, and being highly resistive to weather conditions so that it can be stored outdoors without any risk of damage thereto.

Further objects and advantages of the invention will become apparent from the following description and claims, and from the accompanying drawings, wherein:

FIGURE 1 is a perspective view of an improved water control gate device constructed in accordance with the present invention.

FIGURE 2 is a fragmentary front eelvational view of the water control device illustrated in FIGURE 1, shown installed at the edge of a rice field.

FIGURE 3 is a vertical cross sectional view taken substantially on the line 3—3 of FIGURE 2.

FIGURE 4 is a fragmentary horizontal cross sectional view taken substantially on the line 4—4 of FIGURE 3.

In growing rice, each rice field must be flooded to a depth of at least three inches several times during each season. In the prior practice, hand labor has been employed to cut trenches in each levee to allow water to flow from one rice field down to the next lower rice field. When the subjacent field has been flooded to the desired depth, it has been necessary to fill these trenches, against the force of the rushing water therein, with available mud. In this process, it has been inevitably necessary to dig up rice plants in order to obtain the necessary mud. Under flash flood conditions or where defects develop in the levees, breaks occur which waste water and which cause the digging up and destruction of even more growing rice plants. The prior practice therefore is relatively expensive, laborious, time-consuming and uneconomical. A prime purpose of the present invention is to provide a device which eliminates the laborious and time-consuming practices of the past in this art and which provides a reliable and positive means for controlling the flow of water between adjacent rice fields without the necessity of digging up mud, and therefore, with minimum risk of damage to growing rice plants.

Referring to the drawings, 11 generally designates an assembled water control gate device according to the present invention adapted to be installed in a levee 30 at the edge of a rice field adjacent to another rice field, intended to be flooded at times by water passing from one field to the other. The various parts of the device are made of relatively durable inexpensive plastic material, such as fiberglass or polyethylene.

The gate assembly 11 comprises a main channel member 12 having vertical sidewalls 13, 13 and a horizontal bottom wall 14, the body 12 being provided with the parallel front and rear vertical flanges 15 and 16 which project outwardly therefrom. The flanges 15 and 16 are of substantially identical shape and are of substantial width, the flange 15 being located adjacent the rear margin of the channel member 12 and the flange 16 being located adjacent to and spaced a short distance rearwardly from the front edge 17 of the bottom wall 14, the rear flange 15 being similarly located with respect to the rear edge 18 of said bottom wall 14. The flanges 15 and 16 serve as anchoring means adapted to be embedded in the soil around the gate device for holding the gate device anchored in a stationary position, for example, at the edge of a rice field, as illustrated in FIGURES 2 and 3.

The sidewalls 13, 13 project forwardly a short distance relative to the transverse vertical plane of edge 17, and the forward marginal portions of said sidewalls are integrally formed with vertical closely spaced ribs 20, 21 defining relatively narrow vertical guideways 22 therebetween. The inside faces of the ribs 21 are flush with the edge 17 of bottom wall 14.

Designated at 23 is a transversely extending adjustable gate which is formed of plastic material of the same type employed for the gate body 12, the member 23 being substantially rectangular in shape and being horizontally elongated so that the end edges of the member 23 will slidably fit into the channels 22. As shown in FIGURES 1 and 3, the gate member 23 is arcuately curved vertically, and said member 23 is sufficiently bowed and has a sufficient amount of flexibility to allow it to frictionally engage in the vertical channels 22 and to hold itself in position by frictional engagement once it has been adjusted vertically in said channels. As will be readily apparent from FIGURE 3, the member 23 may be adjusted vertically along the channels 22 to any desired position, for example, may be adjusted so that its top edge is elevated above the top plane of the side walls 13, 13, as shown in dotted view in FIGURE 3, whereby to allow water to flow through the member 12 past the bottom edge of the gate member 23, or alternatively may be adjusted downwardly to any desired position to allow water to flow over the top edge of member 23. It will therefore be apparent that the gate member 23 may be adjusted to a position to hold the water at the left side thereof, as viewed in FIGURE 3, at any desired constant level, to drain off any desired amount of water, and to handle any situation requiring transfer of water from one field to a subjacent field. Due to the resiliency of the gate member 23, it will retain its adjusted position, by frictional engagement in the channels 22, but can be readily adjustable to any desired new position by either manually raising or manually lowering same.

Where it is desired to have minimum resistance to flow between the adjacent fields, the gate member 23 may be entirely removed, providing a clear passage through the channel-shaped main body 12.

As above mentioned, the gate member 23 may be adjusted to its position of fullest water retention, shown in FIGURES 2 and 3, wherein the bottom edge of the gate member 23 is at the level of the bottom wall 14. This position provides a safety overflow condition which prevents excessive hydrostatic pressure on earthen levees, which might otherwise be broken, causing costly and damaging flooding. The gate member 23 may be lowered, for example, as shown in dotted view at the lower portion of FIGURE 2, which will retain a partial amount of water and which will permit substantial flow through the channel body 12. A third possible position of adjustment is indicated in dotted view at the top portion of FIGURES 2 and 3, wherein the gate member 23 is elevated to permit flow of water through the rectangular aperture defined between the bottom edge of the member 23 and the walls of the channel member 12 below said bottom edge. The rate of flow of the water may be controlled by adjusting the size of the aforesaid rectangular aperture, namely, by vertically adjusting the gate member 23.

While a specific embodiment of an improved water level control device for use in rice agriculture has been disclosed in the foregoing description, it is to be understood that various modifications within the spirit of the invention may occur to those skilled in the art. Therefore, it is intended that no limitations be placed on the invention except as defined by the scope of the appended claims.

What is claimed is:

1. A device for controlling flow of water between adjacent rice fields comprising a rigid channel-shaped body having outwardly projecting flange means adapted to be embedded in the soil in a levee between the adjacent fields, whereby to define a water flow passage through the levee, the side walls of the body being formed with vertical grooves, and a resilient plate member arcuately curved vertically continuously throughout its height and having its end edges frictionally engaged in said vertical grooves, said plate member defining a cylindrical resilient gate closure from side edge to side edge, each side edge being biased against opposite walls of its respective seating groove for frictionally-positioning the gate closure relative to the bottom of the channel-shaped body, the plate member acting as a flow-controlling gate and being manually vertically adjustable in said grooves.

2. A device for controlling flow of water between adjacent rice fields comprising a rigid channel-shaped body having outwardly projecting flange means adapted to be embedded in the soil in a levee between the adjacent fields, whereby to define a water flow passage through the levee, the side walls of the body being formed with vertical grooves, and a resilient plate member arcuately curved vertically continuously throughout its height and having its end edges frictionally engaged in said vertical grooves, said plate member defining a cylindrical resilient gate closure from side edge to side edge, each side edge being biased against opposite walls of its respective seating groove for frictionally-positioning the gate closure relative to the bottom of the channel-shaped body, the plate member acting as a flow-controlling gate and being manually vertically adjustable in said grooves, said vertical grooves being substantially flush with one transverse vertical end plane of the body, whereby said plate member may be at times adjusted to a position wherein its bottom edge is below the bottom wall of the channel-shaped body.

3. A device for controlling flow of water between adjacent rice fields comprising a rigid channel-shaped body having respective outwardly projecting flanges adjacent its front and rear margins, said flanges being adapted to be embedded in the soil in a levee between the adjacent fields, whereby to define a water flow passage through the levee, the side walls of the body being formed with vertical grooves, and a resilient plate member arcuately curved vertically continuously throughout its height and having its end edges frictionally engaged in said vertical grooves, said plate member defining a cylindrical resilient gate closure from side edge to side edge, each side edge being biased against opposite walls of its respective seating groove for frictionally-positioning the gate closure relative to the bottom of the channel-shaped body, the plate member acting as a flow-controlling gate and being manually vertically adjustable in said grooves, said vertical grooves being substantially flush with one transverse vertical end plane of the body, whereby said plate member may be at times adjusted to a position wherein its bottom edge is below the bottom wall of the channel-shaped body.

References Cited by the Examiner

UNITED STATES PATENTS

| | | | |
|---|---|---|---|
| 863,764 | 8/1907 | Taylor. | |
| 1,018,662 | 2/1912 | Harlan | 251—176 X |
| 2,042,350 | 5/1936 | McGuire | 61—28 |
| 2,079,896 | 5/1937 | Brosius | 251—327 X |
| 2,527,050 | 10/1950 | Abercrombie | 251—327 |
| 2,813,694 | 11/1957 | Harmes et al. | 251—158 X |
| 2,891,762 | 6/1959 | Kellogg | 251—327 |

FOREIGN PATENTS

| | | |
|---|---|---|
| 379,166 | 6/1922 | Germany. |
| 621,477 | 11/1935 | Germany. |

EARL J. WITMER, *Primary Examiner.*